(12) United States Patent
Jayaraman et al.

(10) Patent No.: US 10,268,824 B2
(45) Date of Patent: Apr. 23, 2019

(54) METHOD AND SYSTEM FOR IDENTIFYING TEST CASES FOR PENETRATION TESTING OF AN APPLICATION

(71) Applicant: Wipro Limited, Bangalore (IN)

(72) Inventors: Venkata Subramanian Jayaraman, Chennai (IN); Sumithra Sundaresan, Chennai (IN)

(73) Assignee: Wipro Limited, Bangalore (IN)

( * ) Notice: Subject to any disclaimer, the term of this patent is extended or adjusted under 35 U.S.C. 154(b) by 189 days.

(21) Appl. No.: 15/070,490

(22) Filed: Mar. 15, 2016

(65) Prior Publication Data

US 2017/0255782 A1    Sep. 7, 2017

(30) Foreign Application Priority Data

Mar. 1, 2016 (IN) .............................. 201641007234

(51) Int. Cl.
*G06F 21/57* (2013.01)
(52) U.S. Cl.
CPC ...... *G06F 21/577* (2013.01); *G06F 2221/033* (2013.01)
(58) Field of Classification Search
CPC .................... G06F 21/577; G06F 2221/033
See application file for complete search history.

(56) References Cited

U.S. PATENT DOCUMENTS 7,278,163 B2 * 10/2007 Banzhof ............... G06F 21/577
 705/38
8,494,974 B2  7/2013 Watters et al.
8,752,182 B2  6/2014 Amit et al.
(Continued)

FOREIGN PATENT DOCUMENTS

WO    WO 2015/025694    2/2015

OTHER PUBLICATIONS

Bg19bot: "CVSS—Wikipedia", Retrieved from the internet: URL:https://en.wikipedia.org/w/index.php?title=CVSS&oldid=699422810, Jan. 12, 2016, 9 pages.
Extended European Search Report issued in the European Patent Office in counterpart European Application No. 16176951.8, dated Jul. 5, 2017, 7 pages.

*Primary Examiner* — Daniel B Potratz
*Assistant Examiner* — Vu V Tran
(74) *Attorney, Agent, or Firm* — Finnegan, Henderson, Farabow, Garrett & Dunner LLP

(57) ABSTRACT

The present disclosure relates to a method and a system for identifying one or more test cases for penetration testing of an application associated with an entity. An application testing system receives data related to application from one or more data sources and uses the data to determine threat score, vulnerability score, human error score, business impact score and popularity score. Further, application testing system identifies threat quantifier value based on threat score, vulnerability score and human error score. The application testing system also determines impact quantifier value based on business score and popularity score. The application testing system then determines threat severity level and impact severity level based on threat quantifier value and impact quantifier value. Based on the determined threat severity level and the impact severity level, the application testing system identifies the one or more test cases for performing penetration testing of the application.

19 Claims, 4 Drawing Sheets

(56) References Cited

U.S. PATENT DOCUMENTS

| | | | |
|---|---|---|---|
| 8,910,293 B2 | 12/2014 | Pistoia et al. | |
| 9,069,967 B2 | 6/2015 | Wysopal et al. | |
| 9,141,805 B2 | 9/2015 | Giakouminakis et al. | |
| 2009/0055804 A1 | 2/2009 | Blaschek et al. | |
| 2011/0191854 A1 | 8/2011 | Giakouminakis et al. | |
| 2011/0320307 A1* | 12/2011 | Mehta | G06Q 30/0282 705/26.7 |
| 2013/0014188 A1 | 3/2013 | Giakouminakis et al. | |
| 2013/0096980 A1* | 4/2013 | Basavapatna | G06Q 10/00 705/7.28 |
| 2014/0137257 A1* | 5/2014 | Martinez | H04L 63/1433 726/25 |
| 2015/0106939 A1 | 4/2015 | Lietz et al. | |
| 2015/0237062 A1 | 8/2015 | Roytman et al. | |
| 2015/0237063 A1 | 8/2015 | Cotton et al. | |
| 2015/0242634 A1 | 8/2015 | Lietz et al. | |
| 2015/0361650 A1 | 12/2015 | Kaplan et al. | |

\* cited by examiner

METHOD AND SYSTEM FOR IDENTIFYING TEST CASES FOR PENETRATION TESTING OF AN APPLICATION

TECHNICAL FIELD

The present subject matter is related, in general to data analytics, and more particularly, but not exclusively to a method and a system for identifying one or more test cases for penetration testing of an application associated with an entity.

BACKGROUND

Data Analytics has taken over the world for providing details regarding each and every activity that happens in any field. One of the major uses of data analytics is the predictions that can be made based on the analysis and co-relate the results obtained to the overall success that could be achieved. Data analytics helps in finding any kind of security breach and data breach as well.

Currently, the journey towards digitization has reached a stage where the security breaches and data breach is inevitable. The leak of sensitive information creates a massive need to identify and address the threat. When cloud virtualization and big data are considered, bigger risks have been injected in the system. Therefore, penetration testing is of utmost importance to overcome the security breaches and the data breach. The method whereby safety, security and compliance testing can be carried out seamlessly by doing testing around risk and vulnerabilities is known as penetration testing. The penetration testing/pen test is a software attack on a computer system that looks for security weaknesses, potentially gaining access to the computer's features and data. However, penetration testing is very complicated and expensive.

Existing systems provide several methods to perform the penetration testing. But mostly, the testing performed with existing tools provides only individual results. As an example, Nmap, tool can do only port mapping and scans the data. But the tool does not look for any user pattern or attacker pattern. Further, as an example, Nessus is a tool that performs an Operating System (OS) detection and vulnerability test. But the Nessus tool does not provide an overview of how and where the human error can happen. Furthermore, existing methods provide password cracking tools that crack only the password to show the human error possibilities. But the password cracking tool does not provide a market study pattern to show the business user about various possibilities of errors. Therefore, the cost involved in penetration testing using the existing methods is very high and the process provided is complicated which hinders the business. This leads to the loss of customer expectation and satisfaction.

Therefore there is need for a method and a system which provides effective way of analysing the data so that one or more test cases can be identified for penetration testing of an application associated with an entity to overcome the cost and time related issues.

SUMMARY

One or more shortcomings of the prior art are overcome and additional advantages are provided through the present disclosure. Additional features and advantages are realized through the techniques of the present disclosure. Other embodiments and aspects of the disclosure are described in detail herein and are considered a part of the claimed disclosure.

Disclosed herein are a method and a system for identifying one or more test cases for penetration testing of an application associated with an entity. The one or more test cases are identified based on scores that are determined considering all the parameters involved in penetration testing such as threat to the application, vulnerability of the application to the threats, human error while developing the application, impact of the application on business and popularity of the application among people. The identified one or more test cases determine part of the application on which penetration testing has to be performed, thereby reducing the cost and time related issues for performing penetration testing on the entire application.

Accordingly, the present disclosure relates to a method of identifying one or more test cases for penetration testing of an application associated with an entity. The method comprises receiving, by an application testing system, data related to the application from one or more data sources. Thereafter, the application testing system determines a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application based on the received data. Further, the application testing system determines a threat quantifier value based on the threat score, the vulnerability score and the human error score. Thereafter, the application testing system determines an impact quantifier value based on the business impact score and the popularity score. Upon determining the threat quantifier value and the impact quantifier value, the application testing system determines a threat severity level and an impact severity level based on the corresponding threat quantifier value and the impact quantifier value. Finally, the application testing system identifies the one or more test cases based on the threat severity level and the impact severity level for performing penetration testing of the application.

Further, the present disclosure relates to an application testing system to identify one or more test cases for penetration testing of an application associated with an entity. The application testing system comprises a processor and a memory communicatively coupled to the processor, wherein the memory stores the processor-executable instructions, which, on execution, causes the processor to receive data related to the application from one or more data sources. Upon receiving the data related to the application, the processor determines a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application based on the received data. Further, the processor determines a threat quantifier value based on the threat score, the vulnerability score and the human error score. Upon determining the threat quantifier value, the processor determines an impact quantifier value based on the business impact score and the popularity score. Furthermore, the processor determines a threat severity level and an impact severity level based on the corresponding threat quantifier value and the impact quantifier value. Finally, the processor identifies the one or more test cases based on the threat severity level and the impact severity level for performing penetration testing of the application.

Further, the present disclosure comprises a non-transitory computer readable medium including instructions stored thereon that when processed by at least one processor causes an application testing system to perform operations comprising receiving data related to the application from one or more data sources. The instructions further cause the processor to determine a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application based on the received data. Thereafter, the instructions cause the processor to determine a threat quantifier value based on the threat score, the vulnerability score and the human error score. Further, the instructions cause the processor to determine an impact quantifier value based on the business impact score and the popularity score. Furthermore, the instructions cause the processor to determine a threat severity level and an impact severity level based on the corresponding threat quantifier value and the impact quantifier value. Finally, the instructions cause the processor to identify the one or more test cases based on the threat severity level and the impact severity level for performing penetration testing of the application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
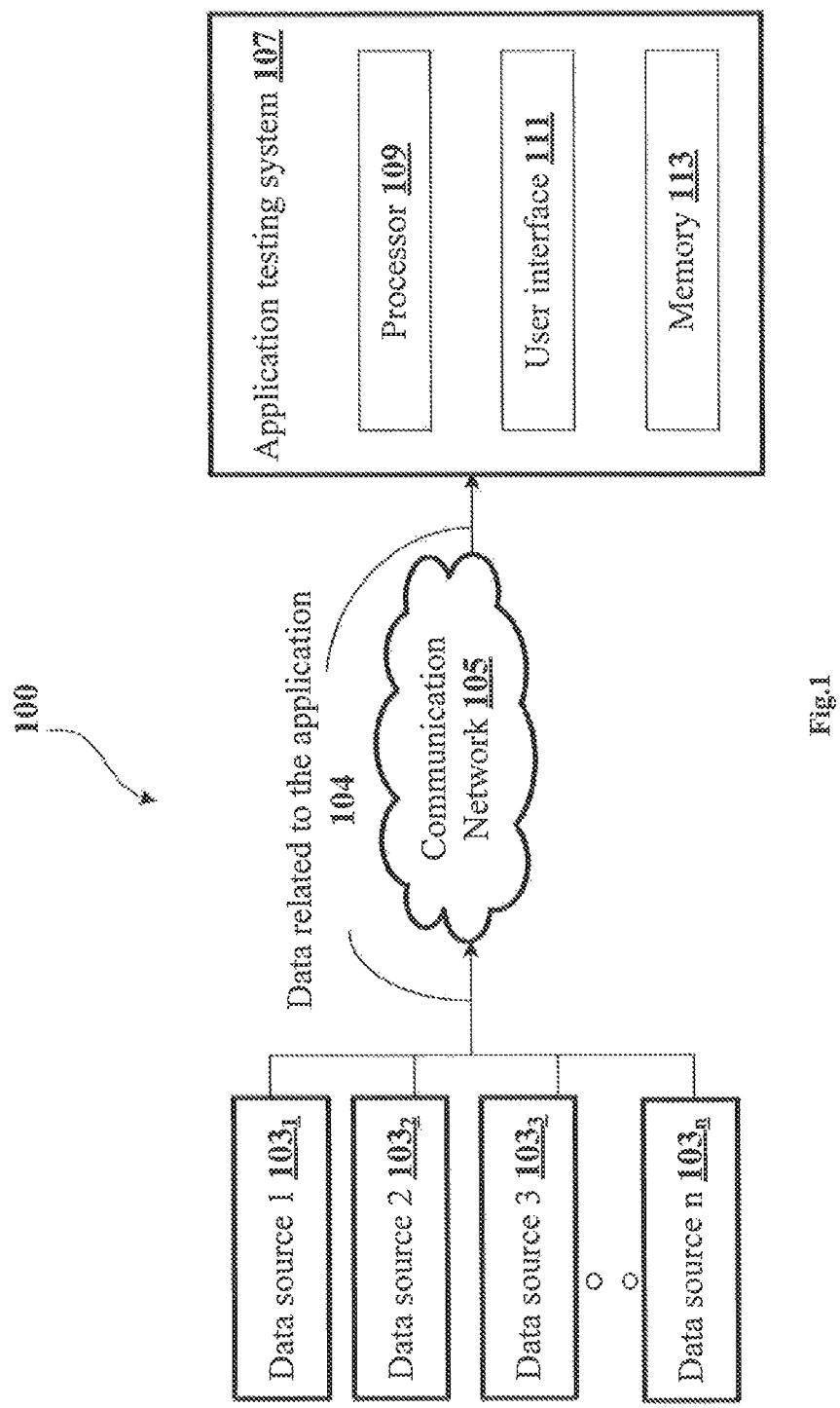
FIG. 1 shows an exemplary architecture to identify one or more test cases for penetration testing of an application associated with an entity, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a system to identify one or more test cases for penetration testing of an application associated with an entity. An application testing system receives data related to the application from one or more data sources. As an example, the data related to the application may include, but not limited to, application type, vulnerability data, human error data, business impact data and popularity data. The received data related to the application is used to determine a threat score, a vulnerability score, a human error score, a business impact score and a popularity score. The threat score indicates one or more threats to the application and the vulnerability score indicates the one or more vulnerabilities of the application to the one or more threats. Further, the human error score indicates probability of the one or more threats due to one or more human errors, the business impact score indicates the impact of the application on the entity and the popularity score indicates popularity of the application. Further, the application testing system identifies a threat quantifier value based on the threat score, the vulnerability score and the human error score. Upon identifying the threat quantifier value, the application testing system determines an impact quantifier value based on the business impact score and the popularity score. The application testing system then determines a threat severity level based on the threat quantifier value and the impact severity level based on the impact quantifier value. Based on the determined threat severity level and the impact severity level, the application testing system identifies the one or more test cases for performing penetration testing of the application.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture to identify one or more test cases for penetration testing of an application associated with an entity, in accordance with some embodiments of the present disclosure.

The architecture 100 comprises one or more data sources, data source 1 $103_1$ to data source n $103_n$ (collectively referred to as one or more data sources 103), a communication network 105 and an application testing system 107. As an example, the one or more data sources 103 may include, but not limited to, one or more market systems and one or more entity databases like a bank database, a retail database etc. The one or more market source systems may provide information collected from one or more data sources 103 across a market such as web links, information collected from individuals who are working on projects and their training data bases etc. The one or more data sources 103 are configured to collect data related to an application 104 associated with an entity. As an example, the entity may be an organisation such as a bank, an educational institution, an insurance company etc. The collected data is provided to the application testing system 107 through the communication network 105. The communication network 105 maybe at least one of wired communication network and wireless communication network.

The application testing system 107 comprises a processor 109, a user interface 111 and a memory 113. The user interface 111 is configured to receive the data related to the application 104 from the one or more data sources 103. As an example, the data related to the application 104 may include, but not limited to, application type, vulnerability data, human error data, business impact data and popularity data. The application type refers to gathering information about kind of the application being used for penetration testing and how much the application is being used. The frequency with which the application is used corresponds to the amount of threat to an application. The vulnerability data refers to historical data to understand how much the application has been prone to threats, how many errors, source code of the application had and how long the application has been active, so that a hacker could have accessed a system. The possibility of vulnerability is a resultant factor of usage of the application and the longevity of the application. The human error data refers to information indicating a possibility of human error that can occur when a developer codes the application. The human error data also indicates if there is a possibility that the developer can develop the application in a better manner to avoid threats to the application. The business impact data indicates importance of the application to business and implications of failures to the business. The popularity data indicates how many people know about the application, because an application is prone to threats only when the application is popular among people. As an example, the application like "Google™" is more likely to be prone to threats than a normal application which is used only by a group of individuals.

The received data related to the application 104 is stored in the memory 113. The processor 109 determines a threat score, a vulnerability score, a human error score, a business impact score and a popularity score based on the data related to the application 104. The threat score indicates one or more threats to the application and the vulnerability score indicates the one or more vulnerabilities of the application to the one or more threats, the human error score indicates probability of the one or more threats due to one or more human errors, the business impact score indicates the impact of the application on the entity and the popularity score indicates popularity of the application.

The threat score is calculated based on the one or more predefined threat parameters related to the application type. The one or more predefined threat parameters may include, but not limited to, kind of the application, usage of the application, number of users for the application, number of hits for the application and frequency of the usage. Each of the one or more predefined threat parameters is assigned with a predefined weightage value based on which the one or more predefined threat parameters are classified into a low category, a medium category and a high category. As an example, the predefined weightage value of "1" may indicate the low category, the predefined weightage value of "2" may indicate the medium category and the predefined weightage value of "3" may indicate the high category.

In an embodiment, the threat score is calculated using a first predefined technique as shown in below mentioned equation (Equation 1).

$$\text{Threat Score} = K^*(\text{Kind of application} + \text{Application usage} + \text{No. of hits})/\text{Frequency of usage} \quad \text{(Equation 1)}$$

In an embodiment, K is a constant variable and the value for the constant variable K may be varied based on requirement for the application testing.

As an example, the value assigned for the constant variable K may be 2 and therefore, the Equation 1 is as provided below.

$$\text{Threat score} = 2^*(\text{Kind of application} + \text{Application usage} + \text{No. of hits})/\text{Frequency of usage}$$

The vulnerability score is calculated based on the one or more predefined vulnerability parameters related to the vulnerability data. The one or more predefined vulnerability parameters may include, but not limited to, number of production tickets that were received which are related to source code of the application, how much development has been done to the application, how long has the system comprising the application has been active, how much vulnerable is a database that is associated with the application and what kind of information does the database comprise. Each of the one or more predefined vulnerability parameters is assigned with the predefined weightage value based on which the one or more predefined vulnerability parameters are classified into the low category, the medium category and the high category.

In an embodiment, the vulnerability score is calculated using a second predefined technique as shown in below mentioned equation (Equation 2).

$$\text{Vulnerability Score} = \text{Production tickets related to source code} + K^*\text{Development done to the application} + P^*\text{No. of years application has been active} - \text{Vulnerability of database}/\text{Vulnerable information} \quad \text{(Equation 2)}$$

In an embodiment, K and P are constant variables and the value for the constant variables K and P may be varied based on the requirement for the application testing.

As an example, the value assigned for the constant variable K may be 2 and the value assigned for the constant variable P may be 3. Therefore, the Equation 2 is as provided below.

> Vulnerability Score=Production tickets related to source code+2*Development done to the application+3*No. of years application has been active−Vulnerability of database/Vulnerable information The human error score is calculated based on the one or more predefined human error parameters related to the human error data. The one or more predefined human error parameters may include, but not limited to, security training attended by the developer/developing team of the application and performance of the developer/developing team, amount of big data involved in the application, implementation of data centric security features in the application and experience of the developer in coding. Each of the one or more predefined human error parameters is assigned with the predefined weightage value based on which the one or more predefined human error parameters are classified into the low category, the medium category and the high category.

In an embodiment, the human error score is calculated using a third predefined technique as shown in below mentioned equation (Equation 3).

> Human Error Score=$K$*Big data involvement+data centric security features−did developer Attended security training/Experience of the developer in coding    (Equation 3)

In an embodiment, K is a constant variable and the value for the constant variable K may be varied based on the requirement for the application testing.

As an example, the value assigned for the constant variable K may be 2 and therefore, the Equation 3 is as provided below.

> Human Error Score=2*Big data involvement+data centric security features−did developer Attended security training/Experience of the developer in coding The business impact score is calculated based on the one or more predefined business impact parameters related to the business impact data. The one or more predefined business impact parameters may include, but not limited to, need of the application for the business, is the application an overhead to the system, how many critical test scenarios are present for the application, does the application contain personal, compliance and life threatening information. Each of the one or more predefined business impact parameters is assigned with the predefined weightage value associated with the low category, the medium category and the high category. Based on the predefined weightage value the one or more predefined business impact parameters are classified into the low category, the medium category and the high category.

In an embodiment, the business impact score is calculated using a fourth predefined technique as shown in below mentioned equation (Equation 4).

> Business Impact Score=sum(No. of critical scenarios involved+information involved)+does business need the application−overhead of a system comprising the application    (Equation 4)

The popularity score is calculated based on the one or more predefined popularity parameters related to the popularity data. The one or more predefined popularity parameters may include, but not limited to, area in which the application is available, does the area have a popular personality like CEO of a bank, founder of an education institution etc. as a customer for the application, area/s in which the application is used, population in the area, how many schools/colleges are there in the area and total working adults who are related to software industry in that area/s. In an embodiment, the number of schools/colleges and working adults related to software industry in the area are considered as popularity parameters with a notion that high probability of hackers may be either school/college going teenagers or working adults who have adequate knowledge about software industry. Each of the one or more predefined popularity parameters is assigned with the predefined weightage value associated with the low category, the medium category and the high category. Based on the predefined weightage value the one or more predefined popularity parameters are classified into the low category, the medium category and the high category.

In an embodiment, the popularity score is calculated using a fifth predefined technique as shown in below mentioned equation (Equation 5).

> Popularity Score=Area in which application is available+$K$*popular personality+Population of area/(Approx. Population of school and colleges+Approx. Adults working in software industry)    (Equation 5)

In an embodiment, K is a constant variable and the value for the constant variable K may be varied based on the requirement for the application testing.

As an example, the value assigned for the constant variable K may be 2 and therefore, the Equation 5 is as provided below.

> Popularity Score=Area in which application is available+2*popular personality+Population of area/(Approx. Population of school and colleges+Approx. Adults working in software industry)

The processor 109 uses the threat score, the vulnerability score and the human error score to determine a threat quantifier value using a sixth predefined technique as shown in below mentioned equation (Equation 6).

> Threat quantifier=(Threat score+Vulnerability rank)*Human error score/$K$    (Equation 6)

In an embodiment, K is a constant variable and the value for the constant variable K may be varied based on the requirement for the application testing.

As an example, the value assigned for the constant variable K may be 10 and therefore, the Equation 6 is as provided below.

> Threat quantifier=(Threat score+Vulnerability rank)*Human error score/10

In an embodiment, the threat quantifier value quantifies one or more threats to the application based on the threat score, the vulnerability score and the human error score.

The processor 109 uses the business score and the popularity score to determine an impact quantifier value using a seventh predefined technique as shown in below mentioned equation (Equation 7).

> Impact Quantifier=2*Business score*Market study score/$K$    (Equation 7)

In an embodiment, K is a constant variable and the value for the constant variable K may be varied based on the requirement for the application testing.

As an example, the value assigned for the constant variable K may be 10 and therefore, the Equation 7 is as provided below.

> Impact Quantifier=2*Business score*Market study score/10

In an embodiment, the impact quantifier value quantifies overall impact of the application to business and amount of the application that should be tested based on the business score and the popularity score.

Upon determining the threat quantifier value and the impact quantifier value, a threat severity level and an impact severity level are determined based on the threat quantifier value and the impact quantifier value. Further, one or more test cases are identified based on the threat severity level and the impact severity level for performing penetration testing of the application. Upon identifying the one or more test cases, the threat to the application and the impact to the application are notified to one or more end users. As an example, the one or more end users may be one or more stakeholders of the entity.

Figure 2:
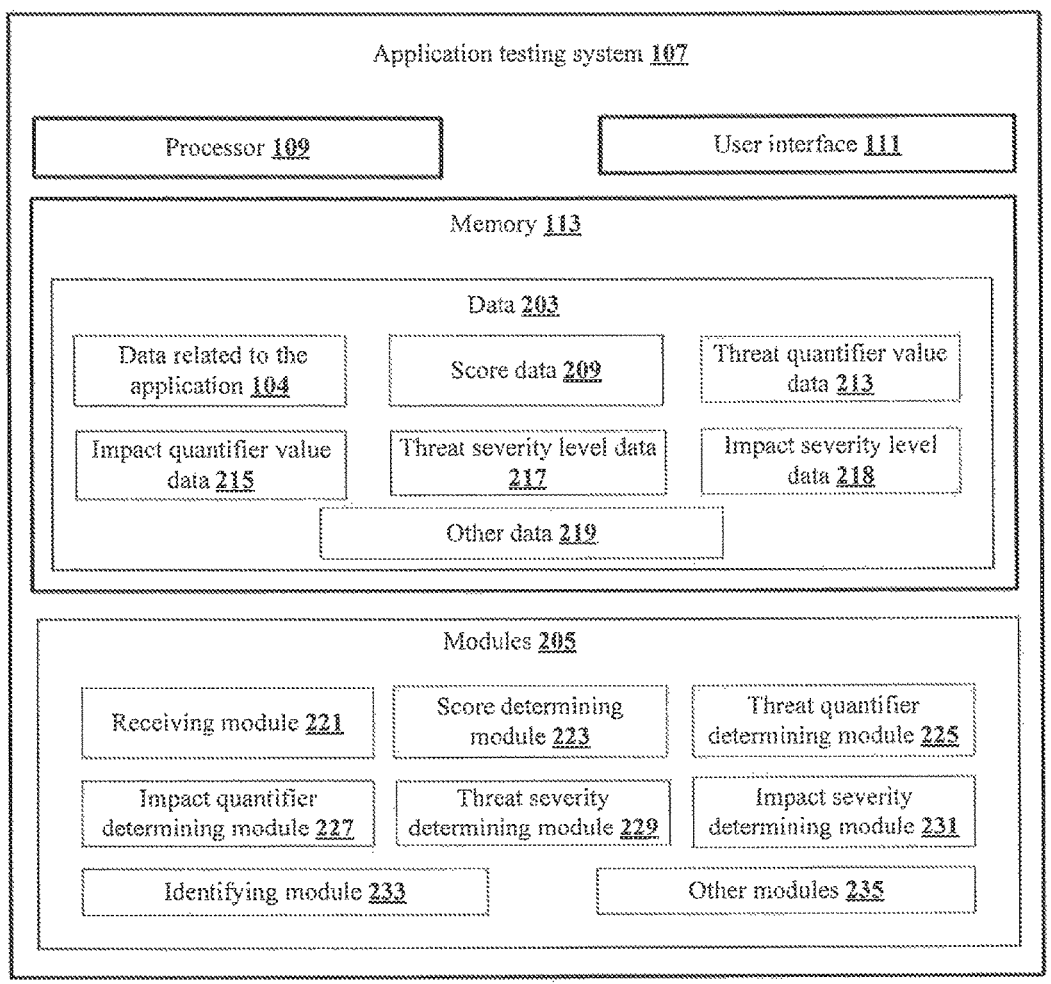
FIG. 2 shows a detailed block diagram of an application testing system to identify one or more test cases for penetration testing of an application associated with an entity in accordance with some embodiments of the present disclosure.

FIG. 2 shows a detailed block diagram of an application testing system to identify one or more test cases for penetration testing of an application associated with an entity in accordance with some embodiments of the present disclosure.

In one implementation, a user interface 111 configured in the application testing system 107, receives data related to an application 104 associated with an entity from the one or more data sources 103. As an example, the data related to the application 104 is stored in a memory 113 configured in the application testing system 107 as shown in the FIG. 2. In one embodiment, data 203 includes data related to an application 104, score data 209, threat quantifier value data 213, impact quantifier value data 215, threat severity level data 217 and impact severity level data 218 and other data 219. In the illustrated FIG. 2, modules 205 are described herein in detail.

In one embodiment, the data may be stored in the memory 113 in the form of various data structures. Additionally, the aforementioned data can be organized using data models, such as relational or hierarchical data models. The other data 219 may store data, including temporary data and temporary files, generated by modules 205 for performing the various functions of the application testing system 107.

In an embodiment, the data related to the application 104 is received from the one or more data sources 103. As an example, the data related to the application 104 may include, but not limited to, application type, vulnerability data, human error data, business impact data and popularity data. The application type refers to gathering information about kind of the application being used for penetration testing and how much the application is being used. The vulnerability data refers to historical data to understand how much the application has been prone to threats, how many errors, source code of the application has and how long the application has been active, so that a hacker could have accessed a system. The human error data refers to information indicating a possibility of human error that can occur when a developer codes the application. The human error data also indicates if there is a possibility that the developer can develop the application in a better manner to avoid threats to the application. The business impact data indicates importance of the application to business and implications of failures to the business. The popularity data indicates how much people know about the application.

In an embodiment, the score data 209 comprises a threat score, a vulnerability score, a human error score, a business score and a popularity score determined by the processor 109 with respect to the application. The threat score indicates one or more threats to the application. The threat score may be determined using a first predefined technique as shown in Equation 1. The vulnerability score indicates the one or more vulnerabilities of the application to the one or more threats. The vulnerability score may be determined using a second predefined technique as shown in Equation 2. The human error score indicates probability of the one or more threats due to one or more human errors. The human error score may be determined using a third predefined technique as shown in Equation 3. The business impact score indicates the impact of the application on the entity. The business impact score may be determined using a fourth predefined technique as shown in Equation 4. The popularity score indicates popularity of the application. The popularity score may be determined using a fifth predefined technique as shown in Equation 5.

In one embodiment, the threat quantifier value data 213 is the data required to quantify overall threat to the application. The overall threat to the application is quantified based on the threat score, the vulnerability score and the human error score. A sixth predefined technique as shown in Equation 6 is used to determine the threat quantifier value.

In one embodiment, the impact quantifier value data 215 is the data required to quantify overall impact of the application on business and amount of the application that needs to be tested. The impact is quantified based on the business score and the popularity score. A seventh predefined technique as shown in Equation 7 is used to determine the impact quantifier value.

In one embodiment, the threat severity level data 217 comprises the threat severity level of the application. The threat severity level is categorized in terms of one of a low category, a medium category and a high category. The threat severity level is determined based on the threat quantifier value.

In an embodiment, the impact severity level data 218 comprises the impact severity level of the application. The impact severity level is categorized in terms of one of the low category, the medium category and the high category. The impact severity level is determined based on the impact quantifier value.

In an embodiment, the data stored in the memory 113 is processed by the modules 205 of the application testing system 107. The modules 205 may be stored within the memory 113. In an example, the modules 205, communicatively coupled to a processor 109 configured in the application testing system 107, may also be present outside the memory 113 as shown in FIG. 2 and implemented as hardware. As used herein, the term module refers to an application specific integrated circuit (ASIC), an electronic circuit, a processor 109 (shared, dedicated, or group) and memory that execute one or more software or firmware programs, a combinational logic circuit, and/or other suitable components that provide the described functionality.

In an embodiment, the modules 205 may include, for example, a receiving module 221, a score determining module 223, a threat quantifier determining module 225, an impact quantifier determining module 227, a threat severity determining module 229, an impact severity determining module 231, an identifying module 233 and other modules 235. The other modules 235 may be used to perform various miscellaneous functionalities of the application testing system 107. It will be appreciated that such aforementioned modules 205 may be represented as a single module or a combination of different modules.

In an embodiment, the receiving module 221 receives the data related to the application 104 from the one or more data sources 103 configured to collect data related to the application 104 associated with the entity. As an example, the one or more data sources 103 may include, but not limited to, one or more market source systems and one or more entity databases like a bank database, a retail database etc. The one or more market source systems may provide information collected from one or more data sources 103 across a market such as web links, information collected from individuals who are working on projects and their training data bases etc.

In an embodiment, the score determining module 223 determines the threat score, the vulnerability score, the human error score, the business impact score and the popularity score. The assessment of threat to the application by determining a threat score is mainly based on kind of the application. As an example, a hacker would have a motive to hack a banking site that has confidential information related to the bank accounts rather than an education site which only has information about people who are in a class, attendance related to the class etc. The threat score is calculated based on the one or more predefined threat parameters related to the application type. The one or more predefined threat parameters may include, but not limited to, the kind of the application, the application usage, number of users for the application, number of hits for the application and frequency of the usage. Each of the one or more predefined threat parameters is assigned with a predefined weightage value that classifies the one or more predefined threat parameters into a low category, a medium category and a high category.

Each of the low category, the medium category and the high category is associated with the predefined weightage value as shown in the below Table 1.

TABLE 1

| Categories | Predefined Weightage value |
|---|---|
| Low | 1 |
| Medium | 2 |
| High | 3 |

According to the above Table 1, the predefined weightage values associated with the low category, the medium category and the high category are 1, 2 and 3 respectively.

In an embodiment, each of the one or more predefined threat parameters are classified into the low category, the medium category and the high category by assigning one of the predefined weightage value associated with the low category, the medium category and the high category to each of the one or more predefined threat parameters.

As an example, consider the Banking application.

The predefined threat parameter "Application usage" is assigned with a predefined weightage value 3. Therefore the predefined threat parameter "Application usage" belongs to the "high category".

The predefined threat parameter "Kind of application" is assigned with a predefined weightage value 3. Therefore the predefined threat parameter "Kind of application" belongs to the "high category".

The predefined threat parameter "Number of hits" is assigned with a predefined weightage value 3. Therefore the predefined threat parameter "Number of hits" belongs to the "high category".

The predefined threat parameter "Frequency of usage" is assigned with a predefined weightage value 2. Therefore the predefined threat parameter "Frequency of usage" belongs to the "medium category".

The classification of the one or more threat parameters into one of the low category, the medium category and the high category by assigning the corresponding predefined weightage value is shown in the below Table 2.

Based on the classification, the threat score is determined using the Equation 1 by substituting the values from the Table 2.

TABLE 2

| Application | Application Usage | Kind of application | No. of hits | Frequency of usage | Threat Score |
|---|---|---|---|---|---|
| Banking | 3 | 3 | 3 | 2 | 9 |
| Retail | 2 | 3 | 3 | 2 | 8 |

According to the above Table 2, the threat score computed for the banking application is 9 and the threat score computed for the retail application is 8.

Similarly, the vulnerability score, the human error score, the business impact score and the popularity score are determined for the application.

The vulnerability score is calculated based on the one or more predefined vulnerability parameters related to the vulnerability data. The one or more predefined vulnerability parameters may include, but not limited to, Number of production tickets that were received were related to source code of the application, how much development has been done to the application, how long has the system comprising the application been active, how much vulnerable is a database that is associated with the application and what kind of information does the database carry. Each of the one or more predefined vulnerability parameters is assigned with the predefined weightage value associated with the low category, the medium category and the high category. The predefined weightage value classifies the one or more predefined vulnerability parameters into the low category, the medium category and the high category.

The classification of the one or more vulnerability parameters into one of the low category, the medium category and the high category by assigning the corresponding predefined weightage value is shown in the below Table 3.

Based on the classification, the vulnerability score is determined using the Equation 2 by substituting the values from the Table 3.

TABLE 3

| Application | Production tickets related to source code | Development done to the application | No. of years the application has been active | Vulnerability of database | Vulnerable information | Vulnerability score |
|---|---|---|---|---|---|---|
| Banking | 2 | 3 | 3 | 2 | 3 | 3.7 |
| Retail | 1 | 2 | 2 | 1 | 1 | 2 |

According to the above Table 3, the vulnerability score computed for the banking application is 3.7 and the vulnerability score of the retail application is 2.

The human error score is calculated based on the one or more predefined human error parameters related to the human error data. The one or more predefined human error parameters may include, but not limited to, did developer/developing team of the application attend security training and how was his/their corresponding performance, amount of big data involved in the application, whether data centric security features are implemented in the application and experience of the developer in coding. Each of the one or more predefined human error parameters is assigned with the predefined weightage value associated with the low category, the medium category and the high category. The predefined weightage value classifies the one or more predefined human error parameters into the low category, the medium category and the high category.

The classification of the one or more human error parameters into one of the low category, the medium category and the high category by assigning the corresponding predefined weightage value is shown in the below Table 4.

Based on the classification, the human error score is determined using the Equation 3 by substituting the values from the Table 4.

TABLE 4

| Application | Security training attended by developer/ developing team | Amount of big data involved | Data centric security features implemented | Experience of the developer in coding | Human Error Score |
|---|---|---|---|---|---|
| Banking | 3 | 3 | 3 | 3 | 3 |
| Retail | 1 | 3 | 3 | 1 | 11 |

According to the above Table 4, the human error score computed for the banking application is 3 and the human error score computed for the retail application is 11.

The business impact score is calculated based on the one or more predefined business impact parameters related to the business impact data. The one or more predefined business impact parameters may include, but not limited to, does business need the application, is the application an overhead to the system, how many critical test scenarios are present for the application, does the application contain personal, compliance and life threatening information. Each of the one or more predefined business impact parameters is assigned with the predefined weightage value associated with the low category, the medium category and the high category. The predefined weightage value classifies the one or more predefined business impact parameters into the low category, the medium category and the high category.

The classification of the one or more business impact parameters into one of the low category, the medium category and the high category by assigning the corresponding predefined weightage value is shown in the below Table 5.

Based on the classification, the business impact score is determined using the Equation 4 by substituting the values from the Table 5.

TABLE 5

| Application | Need of the application for business | Is the application an overhead to system | Number of critical scenarios involved | Involves personal information, compliance and life threatening information | Business impact score |
|---|---|---|---|---|---|
| Banking | 1 | 3 | 2 | 2 | 6 |
| Retail | 3 | 2 | 2 | 3 | 11 |

According to the above Table 5, the business impact score computed for the banking application is 6 and the business impact score for the retail application is 11.

The popularity score is calculated based on the one or more predefined popularity parameters related to the popularity data. The one or more predefined popularity parameters may include, but not limited to, area in which the application is used, is the information in the application about a popular personality, population in the area, how many schools/colleges are there in the area and total working adults who are related to software industry in that area/s. Each of the one or more predefined popularity parameters is assigned with the predefined weightage value associated with the low category, the medium category and the high category. The predefined weightage value classifies the one or more predefined popularity parameters into the low category, the medium category and the high category.

The classification of the one or more popularity parameters into one of the low category, the medium category and the high category by assigning the corresponding predefined weightage value is shown in the below Table 6.

Based on the classification, the popularity score is determined using the Equation 5 by substituting the values from the Table 6.

TABLE 6

| Application | Area in which the application is available | Does the area contain popular personality as customer | Population in the area | Approx. population in school and colleges in the area | Approx. population of working adults in software in the area | Popularity Score |
|---|---|---|---|---|---|---|
| Banking | 3 | 3 | 2 | 2 | 2 | 2.75 |
| Retail | 1 | 0 | 1 | 0 | 1 | 2 |

According to the above Table 6, the popularity score computed for the banking application is 2.75 and the popularity score computed for the retail application is 2.

In an embodiment, the threat quantifier determining module 225 determines the threat quantifier value for the application. The threat quantifier value quantifies the overall threat to the application based on the threat score, the vulnerability score and the human error score. The sixth predefined technique as shown in Equation 6 may be used to calculate the threat quantifier value for the application.

As an example, the Table 7 indicates the threat quantifier value determined for two applications namely "Banking application" and "Retail application".

TABLE 7

| Application | Threat Score | Vulnerability Score | Human Error Score | Threat Quantifier Value |
|---|---|---|---|---|
| Banking | 9 | 3.6 | 3 | 3.78 |
| Retail | 8 | 2 | 11 | 11 |

In an embodiment, the impact quantifier determining module 227 determines the impact quantifier for the application. The impact quantifier value quantifiers the overall impact to the application based on the business impact score and the popularity score. The seventh predefined technique as shown in Equation 7 may be used to calculate the impact quantifier value for the application.

As an example, the Table 8 indicates the impact quantifier value determined for two applications namely "Banking application" and "Retail application".

TABLE 8

| Application | Business impact score | Popularity Score | Impact quantifier value |
|---|---|---|---|
| Banking | 6 | 2.75 | 3.3 |
| Retail | 11 | 1 | 2.2 |

In an embodiment, the threat severity determining module 229 determines the threat severity level of the application. The threat severity level is determined based on the threat quantifier value. The threat severity level is categorized in terms of one of the low category, the medium category and the high category.

If the threat quantifier value is less than or equal to 1, then the threat severity level of the application is "Low".

If the threat quantifier value is greater than 1 but less than or equal to 5, then the threat severity level of the application is "Medium".

If the threat quantifier value is greater than 5, then the threat severity level of the application is "High".

As an example, the Table 9 indicates the threat severity level determined for two applications namely "Banking application" and "Retail application".

TABLE 9

| Application | Threat quantifier value | Threat Severity level |
|---|---|---|
| Banking | 3.78 | Medium |
| Retail | 11 | High |

As an example, in the above Table 9, the threat quantifier value of the banking application is 3.78. Since the threat quantifier value is greater than 1 but less than or equal to 5, the threat severity level of the banking application is "Medium".

In an embodiment, the impact severity determining module 231 determines the impact severity level of the application. The impact severity level is determined based on the impact quantifier value. The impact severity level is categorized in terms of one of the low category, the medium category and the high category.

If the impact quantifier value is less than 0, then the impact severity level of the application is "Low".

If the impact quantifier value is greater than or equal to 1 but less than or equal to 2, then the impact severity level of the application is "Medium".

If the impact quantifier value is greater than 2, then impact severity level of the application is "High".

As an example, the Table 10 indicates the impact severity level determined for two applications namely "Banking application" and "Retail application".

TABLE 10

| Application | Impact quantifier value | Impact Severity level |
|---|---|---|
| Banking | 3.3 | High |
| Retail | 2.2 | Medium |

As an example, in the above Table 10, the impact quantifier value of the banking application is 3.3. Since the impact quantifier value is greater than 2, the impact severity level of the banking application is "High".

In an embodiment, the identifying module 233 identifies one or more test cases for performing penetration testing of the application. The one or more test cases are identified based on the determined threat severity level and the impact severity level of the application. The identified one or more test cases specify what kind of penetration test needs to be done i.e. the one or more test cases indicate the necessary scenarios to be subjected to penetration testing such as scenarios where only risk based testing may be performed, scenario with first priority, scenario with second priority, all possible scenarios etc. Upon identifying the one or more test cases, the threat to the application and the impact to the application are notified to one or more end users. As an example, the one or more end users may be one or more stakeholders of the entity.

As an example, Table 11 indicates the identified one or more test cases for different combinations of the threat severity level and the impact severity level.

TABLE 11

| Threat Severity level | Impact severity level | Test cases |
|---|---|---|
| High | High | All possible scenarios |
| Medium | Medium | Priority 1 and 2 scenarios |
| Low | Low | Risk based testing |
| High | Medium | All possible scenarios |
| Medium | high | All possible scenarios |
| Low | Medium | Priority 1 and 2 scenarios |
| High | Low | Priority 1 and 2 scenarios |
| Medium | Low | Priority 1 and 2 scenarios |
| Low | Medium | Priority 1 and 2 scenarios |

As an example, consider the first combination and the second combination in the Table 11.

In the first combination, the threat severity level is "High" and the impact severity level is "High". Therefore, the penetration testing may be performed for all possible scenarios.

In the second combination, the threat severity level is "Medium" and the impact severity level is "Medium".

Therefore, the penetration testing may be performed for the scenario with first priority and for the scenario with second priority.

Similarly, penetration testing of the application is performed for rest of the combinations.

Figure 3:
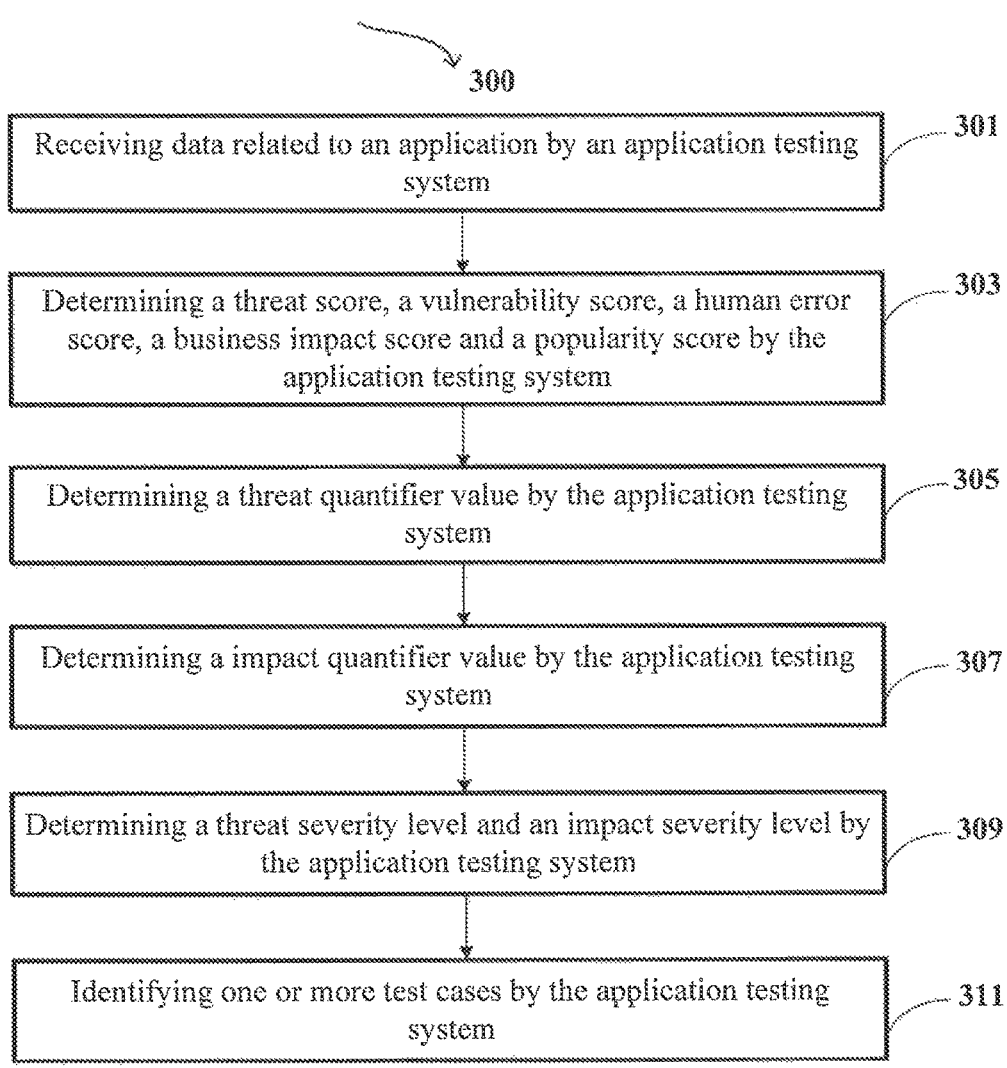
FIG. 3 illustrates a flowchart to identify one or more test cases for penetration testing of an application associated with an entity, in accordance with some embodiments of the present disclosure.

FIG. 3 illustrates a flowchart to identify one or more test cases for penetration testing of an application associated with an entity, in accordance with some embodiments of the present disclosure.

As illustrated in FIG. 3, the method 300 comprises one or more blocks illustrating a method to identify one or more test cases for penetration testing of an application associated with an entity. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, data related to an application 104 is received from the one or more data sources 103 by an application testing system 107 to identify one or more test cases for penetration testing of an application associated with an entity. In an embodiment, the data related to the application 104 is received by a user interface 111 configured in the application testing system 107. As an example, the one or more data sources 103 may include, but not limited to, one or more market systems and one or more entity databases like a bank database, a retail database etc. As an example, the data related to the application 104 may include, but not limited to, application type, vulnerability data, human error data, business impact data and popularity data. The application type refers to gathering information about kind of the application being used for penetration testing and how much the application is being used. The vulnerability data refers to historical data to understand how much the application has been prone to threats, how many errors, source code of the application had and how long the application has been active, so that a hacker could have accessed a system. The possibility of vulnerability is a resultant factor of usage of the application and the longevity of the application. The human error data refers to information indicating a possibility of human error that can occur when a developer codes the application. The human error data also indicates if there is a possibility that the developer can develop the application in a better manner to avoid threats to the application. The business impact data indicates importance of the application to business and implications of failures to the business. The popularity data indicates how much people know about the application, because an application is prone to threats only when the application is popular among people.

At block 303, a threat score, a vulnerability score, a human error score, a business impact score and a popularity score are determined for the application based on the data related to the application 104. In an embodiment, the processor 109 determines a threat score, a vulnerability score, a human error score, a business impact score and a popularity score. The threat score indicates one or more threats to the application and the vulnerability score indicates the one or more vulnerabilities of the application to the one or more threats, the human error score indicates probability of the one or more threats due to one or more human errors, the business impact score indicates the impact of the application on the entity and the popularity score indicates popularity of the application.

The threat score is calculated based on the one or more predefined threat parameters related to the application type. The one or more predefined threat parameters may include, but not limited to, kind of the application, usage of the application, number of users for the application, number of hits for the application and frequency of the usage.

The vulnerability score is calculated based on the one or more predefined vulnerability parameters related to the vulnerability data. The one or more predefined vulnerability parameters may include, but not limited to, number of production tickets that were received which are related to source code of the application, how much development has been done to the application, how long has the system comprising the application has been active, how much vulnerable is a database that is associated with the application and what kind of information does the database comprise.

The human error score is calculated based on the one or more predefined human error parameters related to the human error data. The one or more predefined human error parameters may include, but not limited to, security training attended by the developer/developing team of the application and performance of the developer/developing team, amount of big data involved in the application, implementation of data centric security features in the application and experience of the developer in coding.

The business impact score is calculated based on the one or more predefined business impact parameters related to the business impact data. The one or more predefined business impact parameters may include, but not limited to, need of the application for the business, is the application an overhead to the system, how many critical test scenarios are present for the application, does the application contain personal, compliance and life threatening information.

The popularity score is calculated based on the one or more predefined popularity parameters related to the popularity data. The one or more predefined popularity parameters may include, but not limited to, area in which the application is available, does the area have a popular personality like CEO of a bank, founder of an education institution etc. as a customer for the application, area/s in which the application is used, population in the area, how many schools/colleges are there in the area and total working adults who are related to software industry in that area/s.

At block 305, a threat quantifier value is determined by the application testing system 107. In an embodiment, the processor 109 uses the determined threat score, the vulnerability score and the human error score to determine the threat quantifier value for the application. The threat quantifier value quantifies one or more threats to the application based on the threat score, the vulnerability score and the human error score.

At block 307, an impact quantifier value is determined by the application testing system 107. In an embodiment, the processor 109 uses the business score and the popularity score to determine an impact quantifier value of the application. The impact quantifier value quantifies overall impact to of the application to business and amount of the application that should be tested based on the business score and the popularity score.

At block 309, a threat severity level and an impact severity level are determined by the application testing system 107. In an embodiment, the processor 109 determines the threat severity level and the impact severity level based on the threat quantifier value and the impact quantifier value respectively. The threat severity level and the impact severity level are in terms of one of the low category, the medium category and the high category.

At block 311, one or more test cases are identified by the application testing system 107. In an embodiment, the processor 109 identifies the one or more test cases based on the threat severity level and the impact severity level for performing penetration testing of the application. The identified one or more test cases specify what kind of penetration test needs to be done i.e. the one or more test cases indicate the necessary scenarios to be subjected to penetration testing such as scenarios where only risk based testing may be performed, scenario with first priority, scenario with second priority, all possible scenarios etc. Upon identifying the one or more test cases, the threat to the application and the impact to the application are notified to one or more end users. As an example, the one or more end users may be one or more stakeholders of the entity.

Figure 4:
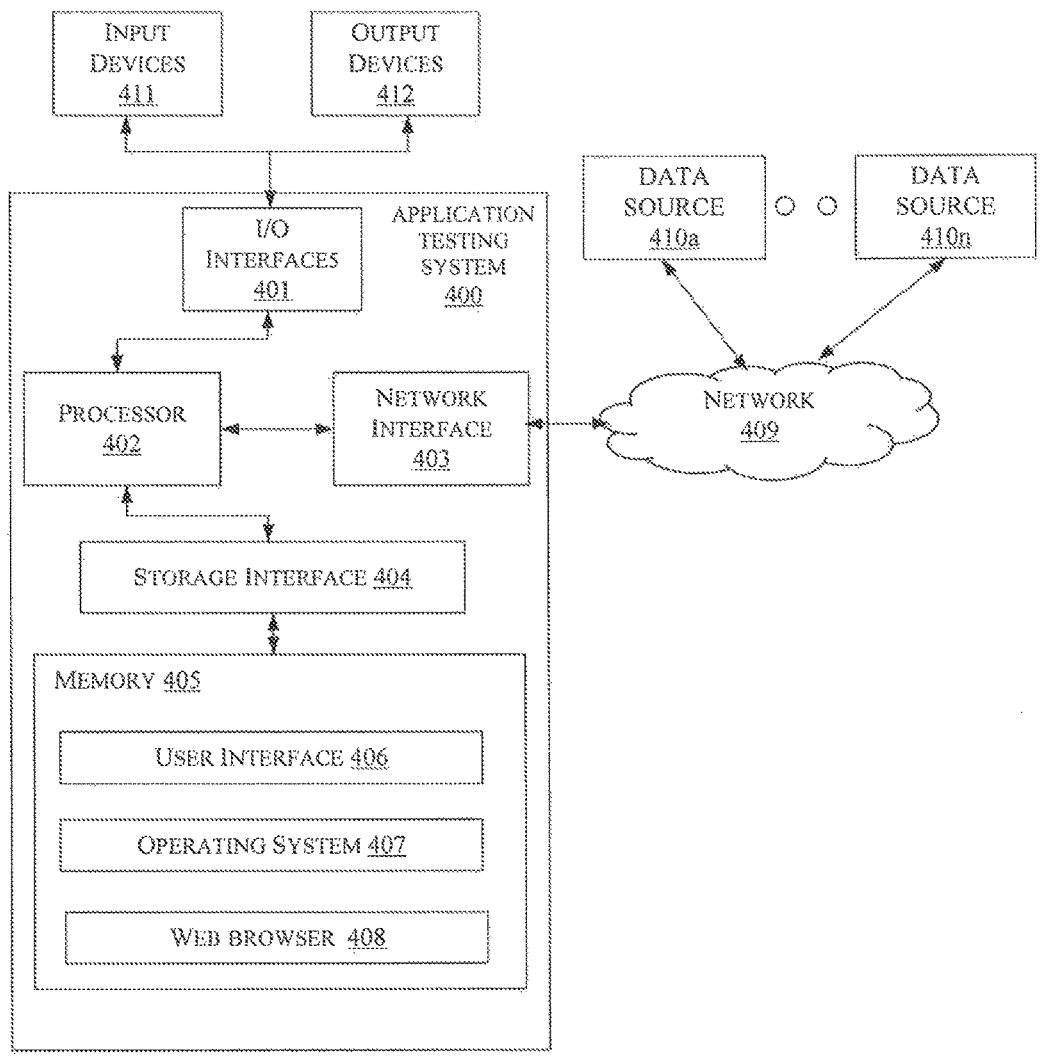
FIG. 4 is a block diagram of an exemplary computer system for implementing embodiments consistent with the present disclosure.

FIG. 4 is a block diagram of an exemplary computer system for implementing embodiments consistent with the present disclosure.

In an embodiment, the application testing system 400 is used to identify one or more test cases for penetration testing of an application associated with an entity. The application testing system 400 may comprise a central processing unit ("CPU" or "processor") 402. The processor 402 may comprise at least one data processor for executing program components for executing user- or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the application testing system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11 ab/g/n/x, etc. Using the network interface 403 and the communication network 409, the application testing system 400 may communicate with one or more data sources 410 (*a*, ... ,*n*). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more data sources 410 (*a*, ... ,*n*) may include, without limitation, personal computer(s), mobile devices such as cellular telephones, smartphones, tablet computers, eBook readers, laptop computers, notebooks, gaming consoles, or the like.

In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user interface application 406, an operating system 407, web server 408 etc. In some embodiments, application testing system 400 may store user/application data 406, such as the data, variables, records, etc. as described in this invention. Such databases may be implemented as fault-tolerant, relational, scalable, secure databases such as Oracle or Sybase.

The operating system 407 may facilitate resource management and operation of the application testing system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. User interface 406 may facilitate display, execution, interaction, manipulation, or operation of program components through textual or graphical facilities. For example, user interfaces may provide computer interaction interface elements on a display system operatively connected to the application testing system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the application testing system 400 may implement a web browser 408 stored program component. The web browser may be a hypertext viewing application, such as Microsoft Internet Explorer, Google Chrome, Mozilla Firefox, Apple Safari, etc. Secure web browsing may be provided using Secure Hypertext Transport Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the application testing system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the application testing system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides a method and a system to identify one or more test cases for penetration testing of an application associated with an entity.

The present disclosure provides a feature wherein the one or more test cases are identified based on a threat severity level and an impact severity level for performing penetration testing of an application. Therefore, only the identified test cases can be performed during the penetration testing instead of testing all possible scenarios.

The present disclosure overcomes the cost and time related issues related to penetration testing due to the identification of the one or more test cases and execution of the one or more test cases.

The present disclosure provides a feature wherein each and every parameter related to the penetration testing is evaluated uniquely to make the security to the application more impactful.

The present disclosure provides a feature wherein the already available data related to the application is used to implement the method and provides a structured result that helps in better understanding.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system to identify one or more test cases for penetration testing of an application associated with an entity. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

REFERRAL NUMERALS

| Reference Number | Description |
| --- | --- |
| 100 | Architecture |
| 103 | One or more data sources |
| 104 | Data related to the application |
| 105 | Communication network |
| 107 | Application testing system |
| 109 | Processor |
| 111 | User interface |
| 113 | Memory |
| 203 | Data |
| 205 | Modules |
| 209 | Score data |
| 213 | Threat quantifier value data |
| 215 | Impact quantifier value data |
| 217 | Threat severity level data |

REFERRAL NUMERALS-continued

| Reference Number | Description |
| --- | --- |
| 218 | Impact severity level data |
| 219 | Other data |
| 221 | Receiving module |
| 223 | Score determining module |
| 225 | Threat quantifier determining module |
| 227 | Impact quantifier determining module |
| 229 | Threat severity determining module |
| 231 | Impact severity determining module |
| 233 | Identifying module |
| 235 | Other modules |

What is claimed is:

1. A method of identifying one or more test cases for penetration testing of an application associated with an entity, the method comprising:
   receiving, by an application testing system, data related to the application from one or more data sources;
   determining, based on the received data, by the application testing system, a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application;
   determining, by the application testing system, a threat quantifier value based on the threat score, the vulnerability score and the human error score, wherein the threat quantifier value is calculated based on a multiplication of a sum of the threat score and the vulnerability score with the human error score;
   determining, by the application testing system, an impact quantifier value based on the business impact score and the popularity score, wherein the impact quantifier value is calculated based on a multiplication of the business impact score with the popularity score;
   determining, by the application testing system, a threat severity level and an impact severity level based on the threat quantifier value and the impact quantifier value; and
   identifying, by the application testing system, the one or more test cases based on the threat severity level and the impact severity level for performing penetration testing of the application.

2. The method as claimed in claim 1, wherein the data comprises application type, human error data, vulnerability data, business impact data, and popularity data.

3. The method as claimed in claim 1, wherein determining the threat score comprises:
   classifying, by the application testing system, one or more predefined threat parameters related to an application type into one of a low category, a medium category, and a high category;
   assigning, by the application testing system, a predefined weightage value to the low category, the medium category and the high category; and
   determining, by the application testing system, the threat score based on the assigned predefined weightage value using a first predefined equation.

4. The method as claimed in claim 1, wherein determining the vulnerability score comprises:
   classifying, by the application testing system, one or more predefined vulnerability parameters related to a vulnerability data into one of a low category, a medium category, and a high category;
   assigning, by the application testing system, a predefined weightage value to the low category, the medium category and the high category; and
   determining, by the application testing system, the vulnerability score based on the assigned predefined weightage value using a second predefined equation.

5. The method as claimed in claim 1, wherein determining the human error score comprises:
   classifying, by the application testing system, one or more predefined human error parameters related to a human error data into one of a low category, a medium category, and a high category;
   assigning, by the application testing system, a predefined weightage value to the low category, the medium category and the high category; and
   determining, by the application testing system, the human error score based on the assigned predefined weightage value using a third predefined equation.

6. The method as claimed in claim 1, wherein determining the business impact score comprises:
   classifying, by the application testing system, one or more predefined business impact parameters related to a business impact data into one of a low category, a medium category, and a high category;
   assigning, by the application testing system, a predefined weightage value to the low category, the medium category and the high category; and
   determining, by the application testing system, the business impact score based on the assigned predefined weightage value using a fourth predefined equation.

7. The method as claimed in claim 1, wherein determining the popularity score comprises:
   classifying, by the application testing system, one or more predefined popularity parameters related to a popularity data into one of a low category, a medium category, and a high category;
   assigning, by the application testing system, a predefined weightage value to the low category, the medium category and the high category; and
   determining, by the application testing system, the popularity score based on the assigned predefined weightage value using a fifth predefined equation.

8. The method as claimed in claim 1, wherein determining the threat severity level comprises:
   comparing, by the application testing system, the threat quantifier value with one or more predefined threat range of values, wherein each of the one or more predefined threat range of values is associated with one of a low category, a medium category and a high category; and
   obtaining, by the application testing system, one of the low category, the medium category and the high category corresponding to the matched predefined threat range of value.

9. The method as claimed in claim 1, wherein determining the impact severity level comprises:
   comparing, by the application testing system, the impact quantifier value with one or more predefined impact range of values, wherein each of the one or more predefined impact range of values is associated with one of a low category, a medium category and a high category; and obtaining, by the application testing system, one of the low category, the medium category and the high category corresponding to the matched predefined impact range of value.

10. An application testing system to identify one or more test cases for penetration testing of an application associated with an entity, the application testing system comprising:
a processor; and
a memory communicatively coupled to the processor, wherein the memory stores the processor-executable instructions, which, on execution, causes the processor to:
receive data related to the application from one or more data sources;
determine based on the received data, a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application;
determine a threat quantifier value based on the threat score, the vulnerability score and the human error score, wherein the threat quantifier value is calculated based on a multiplication of a sum of the threat score and the vulnerability score with the human error score;
determine an impact quantifier value based on the business impact score and the popularity score, wherein the impact quantifier value is calculated based on a multiplication of the business impact score with the popularity score;
determine a threat severity level and an impact severity level based on the threat quantifier value and the impact quantifier value; and
identify the one or more test cases based on the threat severity level and the impact severity level for performing penetration testing of the application.

11. The application testing system as claimed in claim 10, wherein the data comprises application type, human error data, vulnerability data, business impact data, and popularity data.

12. The application testing system as claimed in claim 10, wherein the processor determines the threat score by:
classifying one or more predefined threat parameters related to an application type into one of a low category, a medium category, and a high category, wherein the one or more predefined threat parameters comprises a kind of the application, an application usage, a number of users for the application, a number of hits for the application, and a frequency of usage of the application;
assigning a predefined weightage value to the low category, the medium category and the high category; and
determining the threat score based on the assigned predefined weightage value using a first predefined equation.

13. The application testing system as claimed in claim 10, wherein the processor determines the vulnerability score by:
classifying one or more predefined vulnerability parameters related to a vulnerability data into one of the low category, the medium category, and the high category, wherein the one or more predefined vulnerability parameters comprises a number of production tickets received related to source code of the application, an amount of development done to the application, a period of time for which a system comprising the application has been active, an amount of vulnerability of a database associated with the application, and a kind of information that the database comprises;
assigning a predefined weightage value to a low category, a medium category and a high category; and
determining the vulnerability score based on the assigned predefined weightage value using a second predefined equation.

14. The application testing system as claimed in claim 10, wherein the processor determines the human error score by:
classifying one or more predefined human error parameters related to a human error data into one of a low category, a medium category, and a high category, wherein the one or more predefined human error parameters comprises an attendance of security training by a developer/developing team and a corresponding performance of the developer/developing team, an amount of big data involved in the application, an implementation of data centric security features in the application, and an experience of the developer in coding;
assigning a predefined weightage value to the low category, the medium category and the high category; and
determining the human error score based on the assigned predefined weightage value using a third predefined equation.

15. The application testing system as claimed in claim 10, wherein the processor determines the business impact score by:
classifying one or more predefined business impact parameters related to a business impact data into one of a low category, a medium category, and a high category, wherein the one or more predefined business impact parameters comprises a need of the application for the entity, an amount of overhead the application is to a system, a number of critical test scenarios present for the application, an amount of personal, compliance and life threatening information present in the application;
assigning a predefined weightage value to the low category, the medium category and the high category; and
determining the business impact score based on the assigned predefined weightage value using a fourth predefined equation.

16. The application testing system as claimed in claim 10, wherein the processor determines the popularity score by:
classifying one or more predefined popularity parameters related to a popularity data into one of a low category, a medium category, and a high category, wherein the one or more predefined popularity parameters comprises an area in which the application is available, a popular personality in the area present as a customer for the application, an area in which the application is employed, a population in the area, a number of schools/colleges in the area, and a total number of working adults related to software industry in the area;
assigning a predefined weightage value to the low category, the medium category and the high category; and
determining the popularity score based on the assigned predefined weightage value using a fifth predefined equation.

17. The application testing system as claimed in claim 10, wherein the processor determines the threat severity level by:

comparing the threat quantifier value with one or more predefined threat range of values, wherein each of the one or more predefined threat range of values is associated with one of a low category, a medium category and a high category; and obtaining one of the low category, the medium category and the high category corresponding to the matched predefined threat range of value.

18. The application testing system as claimed in claim 10, wherein the processor determines the impact severity level by:

comparing the impact quantifier value with one or more predefined impact range of values, wherein each of the one or more predefined impact range of values is associated with one of a low category, a medium category and a high category; and obtaining one of the low category, the medium category and the high category corresponding to the matched predefined impact range of value.

19. A non-transitory computer readable medium including instructions stored thereon that when processed by at least one processor causes an application testing system to perform operations comprising:

receiving data related to the application from one or more data sources;

determining based on the received data, a threat score indicating one or more threats to the application, a vulnerability score indicating one or more vulnerabilities of the application to the one or more threats, a human error score indicating probability of the one or more threats due to one or more human errors, a business impact score indicating impact of the application on the entity, and a popularity score indicating popularity of the application;

determining a threat quantifier value based on the threat score, the vulnerability score and the human error score, wherein the threat quantifier value is calculated based on a multiplication of a sum of the threat score and the vulnerability score with the human error score;

determining an impact quantifier value based on the business impact score and the popularity score, wherein the impact quantifier value is calculated based on a multiplication of the business impact score with the popularity score;

determining a threat severity level and an impact severity level based on the threat quantifier value and the impact quantifier value; and identifying the one or more test cases based on the threat severity level and the impact severity level for performing penetration testing of the application.

* * * * *